C. DELANO.
Horse Rake.
No. 6,151.
Patented Feb. 27, 1849.
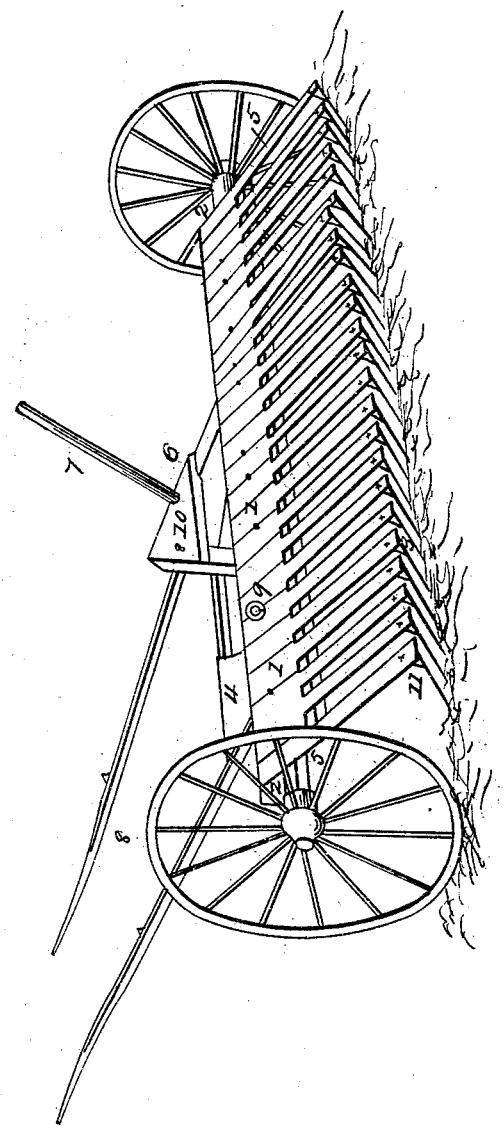
Inventor
Calvin Delano

UNITED STATES PATENT OFFICE.

CALVIN DELANO, OF EAST LIVERMORE, MAINE.

IMPROVEMENT IN HORSE-RAKES.

Specification forming part of Letters Patent No. 6,151, dated February 27, 1849.

*To all whom it may concern:*

Be it known that I, CALVIN DELANO, of East Livermore, in the county of Kennebec and State of Maine, have invented a new and useful Machine for Raking Hay or Grain; and I do hereby declare that the following is a full, clear, and exact description of the construction and operation of the same, reference being had to the annexed drawings, making a part of this specification, in which a transverse perspective view is exhibited, in which—

Figure 1 is the head or heads into which the teeth are inserted. If made of wood, it may be one to one and one-fourth inch in thickness and four inches wide at the upper end, and holding this width about one foot to secure the lateral position of the teeth; thence about two inches in width to the insertion of the teeth.

Fig. 2 is an iron rod, about half-inch diameter, on which the heads of the teeth are strung widthwise in holes in the heads, and which forms the hinge or pivot by which the teeth rise and fall.

Fig. 9 is a bolt or bolts inserted into the axle perpendicularly, with an eye in the upper end of each, (about four inches above the axle,) through which the rod passes.

Fig. 3 are the teeth inserted into the lower end of the heads—one tooth in each head—making an angle of about fifty degrees with the head.

Fig. 4 is the platform, placed on the shafts, on which the operator stands in using the machine.

Fig. 5 is a cross-bar, about three inches square in the center and tapers toward the ends, and placed under the heads of the teeth about nine inches back of the rod and extending the whole width of the machine.

Fig. 6 is a triangle hung to the axle by swivels between the rod and axle and framed into the cross-bar. The front angle extends about thirty inches forward of the axle. This triangle is the lever by which the heads and teeth are raised to discharge the hay or grain.

Fig. 7 is a lever, about four feet long, inserted into the triangle to assist in raising the teeth.

Fig. 8 is the shafts, in which the horse is harnessed.

Fig. 10 is a small platform on the upper corner of the triangle, on which the foot of the operator is placed to assist in raising the cross-bar and teeth.

Fig. 11 is wire stays near the lower ends of the heads of the teeth and around or through the teeth to strengthen them.

The machine may be made of any width by increasing or diminishing the number of heads and teeth. The lateral distances of the teeth are regulated by the width of the heads, which may be more or less than four inches. I use the after wheels of a single-horse wagon, which are four feet in diameter. If of any other diameter, the length of the heads and teeth must be made to correspond. The head for a four-foot wheel is about forty inches between the pivot or rod and the insertion of the tooth, and the length of the teeth is about twenty-three inches.

What I claim as my invention, and desire to secure by Letters Patent, is—

So making horse-rakes by hanging the head or heads on one common rod or pivot, 2, as to allow each tooth to have a separate and independent movement to enable the rake to pass over small as well as large obstructions without disturbing the action of any of the contiguous teeth beyond the obstructing body.

CALVIN DELANO.

Witnesses:
FRANCIS F. HAINES,
FRANCIS G. HAINES.